US005244518A

United States Patent [19]

Krayenhagen et al.

[11] Patent Number: 5,244,518

[45] Date of Patent: Sep. 14, 1993

[54] CORRUGATED BOARD MANUFACTURING APPARATUS AND PROCESS INCLUDING PRECISE WEB MOISTURE AND TEMPERATURE CONTROL

[75] Inventors: Everett D. Krayenhagen, Richmond; Richard D. Hoffmann, Indianapolis, both of Ind.

[73] Assignee: Stickle Steam Specialties Co. Inc., Indianapolis, Ind.

[21] Appl. No.: 608,217

[22] Filed: Nov. 2, 1990

[51] Int. Cl.[5] .................. B32B 31/00

[52] U.S. Cl. .................. 156/64; 156/351; 156/359; 34/23

[58] Field of Search .................. 156/350, 351, 359, 64, 156/361; 162/290; 34/23, 34, 155, 160; 226/29, 30, 31

[56] References Cited

U.S. PATENT DOCUMENTS

| | | | |
|---|---|---|---|
| 3,097,994 | 7/1963 | Dickens et al. | 34/160 X |
| 3,280,737 | 10/1966 | Huck | 226/30 X |
| 3,654,032 | 4/1972 | Kruglinski et al. | 156/470 |
| 3,829,338 | 8/1974 | Hayasi et al. | 156/351 |
| 3,850,792 | 11/1974 | Pennington | 162/290 |
| 3,892,613 | 7/1975 | McDonald et al. | 156/210 |
| 3,981,758 | 9/1976 | Thayer et al. | 156/64 |
| 4,042,446 | 8/1977 | Lawton | 156/359 |
| 4,556,444 | 12/1985 | Schommler | 156/359 |
| 4,704,171 | 11/1987 | Thompson et al. | 156/64 |
| 4,806,183 | 2/1989 | Williams | 156/64 |
| 4,865,675 | 9/1989 | Yamamoto et al. | 156/164 |

*Primary Examiner*—David A. Simmons
*Assistant Examiner*—J. Sells
*Attorney, Agent, or Firm*—Woodard, Emhardt, Naughton, Moriarty & McNett

[57] ABSTRACT

An improved corrugated board manufacturing apparatus and method including precise web moisture and temperature control is disclosed. The apparatus includes steam driven manifolds for zone drying of the web using pressurized steam to reduce moisture and equalize the moisture content across the web. Moisture sensors and temperature sensors are implemented to scan the web and provide feedback information regarding web moisture and temperature. Wrap arm position is automatically controlled to obtain ideal web temperatures for corrugated board production. Web speed and take-up ratios are monitored to determine when process parameters are out of limits which may cause waste. An improved hot plate section including variable pressure applied to the web as well as variable steam supplied to the hot plates results in a more effective process control loop in achieving and maintaining web temperature for curing the adhesive and preventing warping.

7 Claims, 16 Drawing Sheets

CORRUGATED BOARD MANUFACTURING APPARATUS AND PROCESS INCLUDING PRECISE WEB MOISTURE AND TEMPERATURE CONTROL

BACKGROUND OF THE INVENTION

1. Field of the Invention:

This invention relates to corrugated cardboard manufacturing methods and specifically to devices for producing double-free corrugated paperboard or cardboard webs formed by laminating flat facing webs to opposite sides of a corrugated or fluted paper web.

2. Description of the Prior Art:

Corrugated paperboard is manufactured at high production rates on corrugator machines which are well known in the paper industry. A typical machine includes a corrugating and glueing section, a heating section, and a cooling section. In the first section, corrugations are formed transversely across an intermediate web and liquid adhesive is applied to the tips of the flutes of the corrugated web or medium. After the adhesive is applied, a first single-face liner web is brought into contact with the glue-coated flutes to form a laminated single-face web consisting of one liner and a corrugated medium. The device which performs this operation is typically referred to as a single-facer. The single-face web is then advanced past a glue machine downstream to apply adhesive to the exposed flute tips of the medium and thereafter a second double-face liner web is applied to the exposed side of the corrugated medium. The combined and double-face web consisting of a single-face web and the second liner then passes through a heating section where the liquid adhesive holding the second liner to the corrugated medium is cured. The adhesive is cured by passing the freshly glued web across a series of hot plates under pressure from above. The hot plates are usually heated internally by steam to a temperature necessary to cure the adhesive. The pressure is provided by moving the web over the hot plates under an endless ballast belt which rests upon the upper liner of the single-face web and advanced together with the web at the same speed. Weight rollers on top of the lower flight of the belt provide additional pressure to hold the web laminates together and maintain them flat against the hot plates to enhance heat transfer from the hot plates to the web for curing purposes. As the heat acts upon the adhesive, it also drives moisture out of the combined web so that the finished corrugated paperboard web exits from the downstream end of the heating section in a stiffened substantially flat condition. The web then passes immediately through a cooling section to reduce its temperature prior to being divided into a plurality of webs of selected widths each of which is then cut transversely to form corrugated blanks.

It happens relatively often that the moisture of the individual layers of the corrugated cardboard is not uniform over the width thereof. One explanation is that moisture seeps into the paper rolls and penetrates the outer layers of the paper on the rolls but only to a certain depth. Once installed into a corrugator the roll of paper having differing moisture contents over the width of the paper web contributes to warping of the final product. Other factors which may contribute to warping are stresses placed on the web by machinery, adhesive quality and quantity, and heat transfer characteristics.

It is helpful to understand that a warped blank is not flat, and includes a slight curl across the surface of the blank.

The adhesive commonly used in the process is an ungelatinized granular starch in a liquid carrier that is cured by gelatinization and dehydration which results from the application of heat. Prior art devices have suggested the application of moisture and heat to the paper web to precondition the web prior to the application of the adhesive to the fluted medium.

A variety of approaches to improving corrugated cardboard for manufacturing processes have been developed. The patent to McDonald et al., U.S. Pat. No. 3,892,613, notes the importance of moisture and temperature conditioning of the corrugated medium and moisture control of the liner.

Hayasi et al., U.S. Pat. No. 3,829,338, discloses a double-facer machine heat control in which the temperature of the bottom liner is measured at one or more locations along the double-facer heater section, and in which a comparator control device compares the measured value with a predetermined set point. Based upon the comparison, the effective weight or number of ballast rollers engaging the lower run of the double-facer belt is appropriately regulated to attain optimum liner temperature.

The device disclosed in Lawton, U.S. Pat. No. 4,042,446, is an apparatus for supplying heat and pressure to a corrugated paperboard and includes a temperature sensing device to measure the temperature of the corrugated web leaving the heating section of the apparatus. The weight bearing down upon the web is adjusted automatically via rollers contacting the belt in response to the measured temperature in order to maintain the temperature at or near a predetermined value.

Schommler, U.S. Pat. No. 4,556,444, describes a heating device for applying heat to corrugated cardboard which includes several heating plates spaced in the feeding direction of the web and covering the maximum width of the corrugated cardboard web. A moisture sensor is placed in front of each heating plate in the direction of movement. A control device monitors the moisture content of the web and heat is applied to the plates to drive moisture out of the web in order to equalize the moisture content across the web.

Kruglinski et al., U.S. Pat. No. 3,654,032, discloses an apparatus which adds moisture to the outer sheet after the corrugated board leaves the heating plates to equalize moisture content of the sheets and prevent warpage. Kruglinski et al. also discloses sensors for measuring moisture content of the web at the input end of the machine. Information gleaned from the moisture sensors determines the amount of moisture which is introduced into the web.

Thayer et al., U.S. Pat. No. 3,981,758, discloses a method and apparatus for improving overall quality and reducing warp in corrugated paperboard blanks. Generally stated, the device and method of Thayer automatically control the time of heat exposure, bonding pressure, web or liner tension while entering the heater section, and application of moisture to the web.

A primary requirement for proper operation of a corrugator device is that the moisture content of the paper rolls which supply the web to the machine is less than eight percent to make good quality corrugated cardboard. As is shown by the prior art, two methods are most often used to control the moisture content. The first is to apply heat by way of hot plates, and the second method is to apply moisture to equalize the moisture content across the web. A device well known in the industry which incorporates the second technique is a Gaylord Shower device. However, a system which adds moisture to the web is ineffective when the moisture content of the web is already too high to make quality corrugated cardboard. The hot plate technique of removing moisture from various areas of the web is ineffective in that if the heat is supplied to the hot plates via electrical heating or steam supply the amount of time required to vary the process parameters can result in hundreds of linear feet of wasted corrugated board before the process is stabilized and the variances in web moisture are eliminated.

An improved device and method for controlling the moisture content across the web of a corrugated cardboard manufacturing apparatus which also includes process monitoring sensors to improve efficiency and reduce waste is needed.

SUMMARY OF THE INVENTION

An improved apparatus for manufacturing corrugated cardboard including a single-facer, a double-backer, and a hot plate curing section, according to one aspect of the present invention comprises means for monitoring the moisture content of a web as it emerges from the single-facer, the means for monitoring producing a moisture signal corresponding to the moisture content of the web adjacent the means for monitoring, steam drying means for removing moisture from the web, the steam drying means positioned adjacent the web before the web enters the single-facer, the steam drying means supplying steam into the web in response to a signal received at a steam input, processor means for monitoring the moisture signal and supplying a steam activation signal to the steam drying means when the moisture signal indicates moisture in the web is above a predetermined limit.

A method for controlling the moisture in a paper web within a corrugator manufacturing apparatus including a single-facer machine, according to another aspect of the present invention, comprises the steps of sensing the moisture content in the web as it emerges from the single-facer, and applying pressurized steam to the web to lower the moisture content of the web when the sensed moisture content of the web is above a predetermined limit.

One object of the present invention is to provide an improved corrugated cardboard manufacturing device and method.

Another object of the present invention is to control moisture content across the web of a corrugator so that warpage is minimized.

Another object of the present invention is to monitor various operating parameters of a corrugator so as to predict when maintenance repairs should be effected.

A further object of the present invention is to provide a hot plate drying section which includes rapid response temperature varying means for rapidly varying the amount of heat transferred to the web for curing purposes.

These and other objects of the present invention will become more apparent from the following description of the preferred embodiment.

DESCRIPTION OF THE PREFERRED EMBODIMENT

Figure 1A:
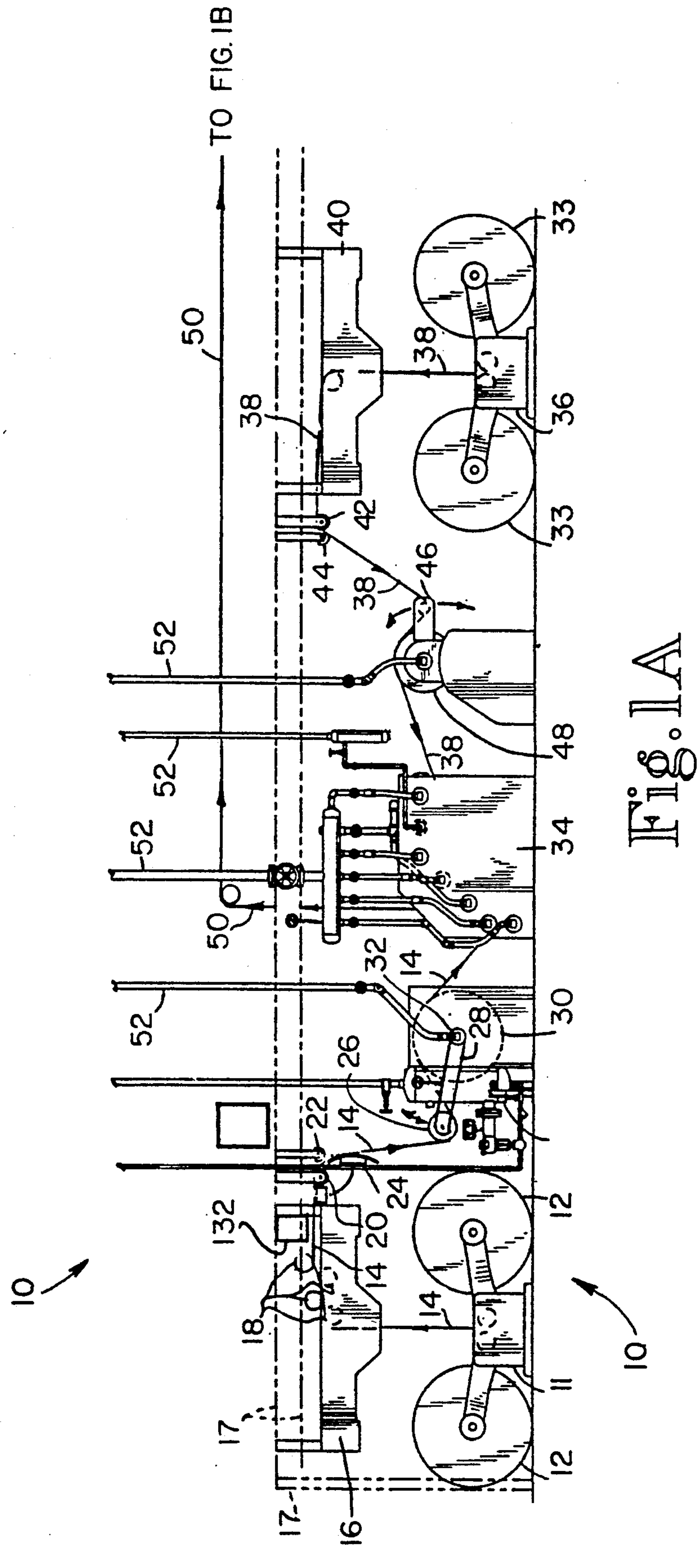
FIGS. 1A and 1B are a front elevational view of a corrugated cardboard manufacturing apparatus according to the present invention.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
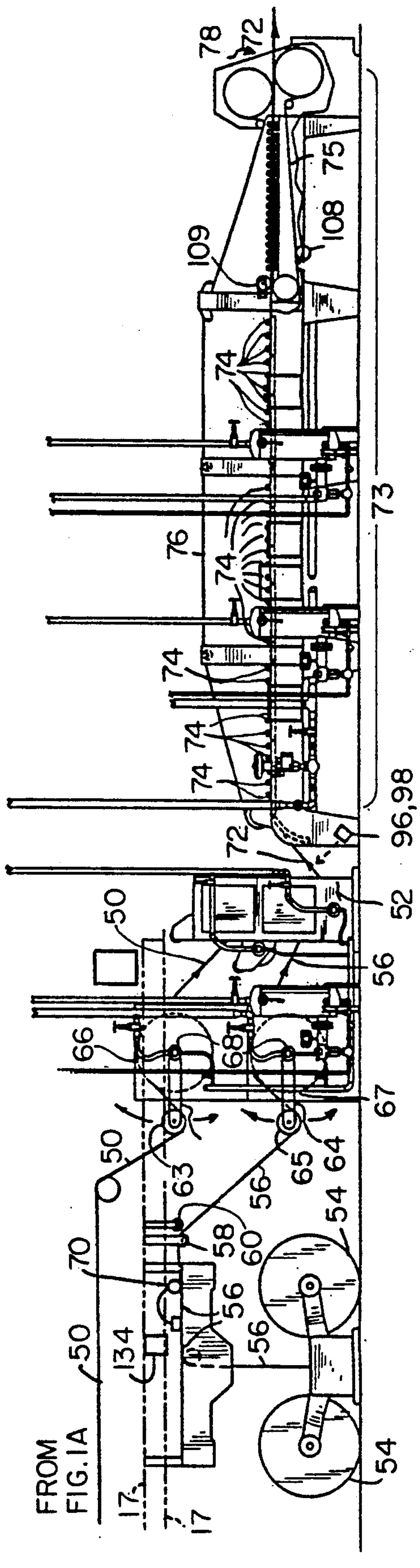

Referring now to FIGS. 1A and 1B, a corrugated cardboard manufacturing apparatus 10 according to the present invention is shown. Roll stand 11 includes two supply rolls 12 of paper mounted thereon. Each roll 12 rotates about its central axis to supply paper or liner which is indicated at 14. The liner or web 14 is supplied to a splicer 16 which is well known in the industry for splicing the end of one roll with the beginning of the second supply roll of paper. The splicer 16 includes rollers 18 which guide the web 14 to idle roller 20. Iron support frames 17 (shown as broken lines) are provided above and along the apparatus 10 and are suitable to attach idler rollers, splicers, sensors, traversing systems (described subsequently) and other items thereto. In addition the web 14 makes contact with paper speed sensing device 22 so that the speed of the web 14 may be sensed.

The web 14 next passes over the surface of steam manifold 24 and wrap arm roller 26. The wrap arm 28 of preheater 30 pivots about location 32 so that the surface area contact of the web 14 with the preheater 30 can be varied and thus the heat transferred to the web maybe varied. The preheater 30 is well known in the art and is typically positioned manually by an operator to position the wrap arm 28 in a particular position corresponding to the amount of heat transfer desired. After passing over the preheater 30 the web 14 enters single-facer 34. The temperature of the paper web 14 as it enters single-facer 34 should be in the range of 190° F. to 210° F. prior to application of the adhesive which is applied between the medium web 38 and the web 14 by the single-facer 33. Supply rolls 34 mounted on roll stand 36 supply paper to the medium web 38. Web 38 travels in the direction of the arrow through splicer 40, which functions similarly as splicer 16, and passes over idler roller 42. Speed sensor 44 makes contact with the web 38 and to provide an output signal indicative of web speed. Wrap arm 46 of preheater 48 functions identically to the preheater 30 and wrap arm 28. The position of wrap arm 46 is controlled by the operator of the apparatus, it being understood that automatic control is contemplated also to achieve the proper temperature of the web 38*a* just prior to the web entering the single-facer 34. The web 38 is corrugated into a fluted medium by the single-facer 34 and has adhesive applied to and is brought into contact with web 14 to produce single-faced web 50. Steam is supplied to the various devices where required and is well known in the art. The single-faced web 50 next passes into double-backer device 52 in FIG. 1B.

Two more supply rolls 54 supply paper for the web 56 which travels over roller 58 and speed sensor 60. Speed sensor 60 produces a signal corresponding to the speed of the web 56. The position of wrap arm 64 is variable according to electrical signals produced by a processor (see FIG. 9) to position roller 65 at any location about the pivot point 68 to increase or decrease the wrap of the web 56 which contacts preheater 67.

Web 56 passes over steam manifold 70 just before it makes contact with roller 58. Steam manifold 70 includes a plurality of solenoid valves controlled by a central processor for controlling the supply of steam to several predefined zones across the web 56. The steam is saturated steam at a pressure of approximately 175 psi and when introduced into the web acts to remove moisture from the web in accordance with the activation of the steam control valves (see FIG. 9). Manifolds 70 and 24 provide a means by which the moisture in the web can be reduced.

Webs 50 and 56 enter the double-backer 52 at the predetermined desired temperatures and exit as a double-faced corrugated board web 72 to enter the hot plate section 73. The hot plate drying section 73 includes a plurality of rollers 74 which are each individually positionable in an upper or lower position in response to activation or deactivation of air cylinders (not shown) which control the vertical position of rollers 74. Each of the individual rollers 74 is mounted to an individual air cylinder for positioning each of the rollers 74 against the web 72 or in a raised position away from the web 72. A plurality of hot plates are positioned beneath the web 72 so that the web 72 is sandwiched between the hot plates beneath the web and the belt 76. As the web 72 travels through the hot plate drying section 73, the adhesive supplied in the double-backer 52 between the liner web 56 and the single-face web 50 is cured and continuous corrugated cardboard exits the rear of the machine near location 78.

The single-facer, preheater and double-backer are available from Langston Corp. of Cherry Hill, N.J., and United Container Machinery Group Inc. of Glen Arm, Md., both of which are well known in the industry as manufacturers of such devices. The hot plate section 73 is available from Interfic Engineering Limited of England.

Figure 2A:
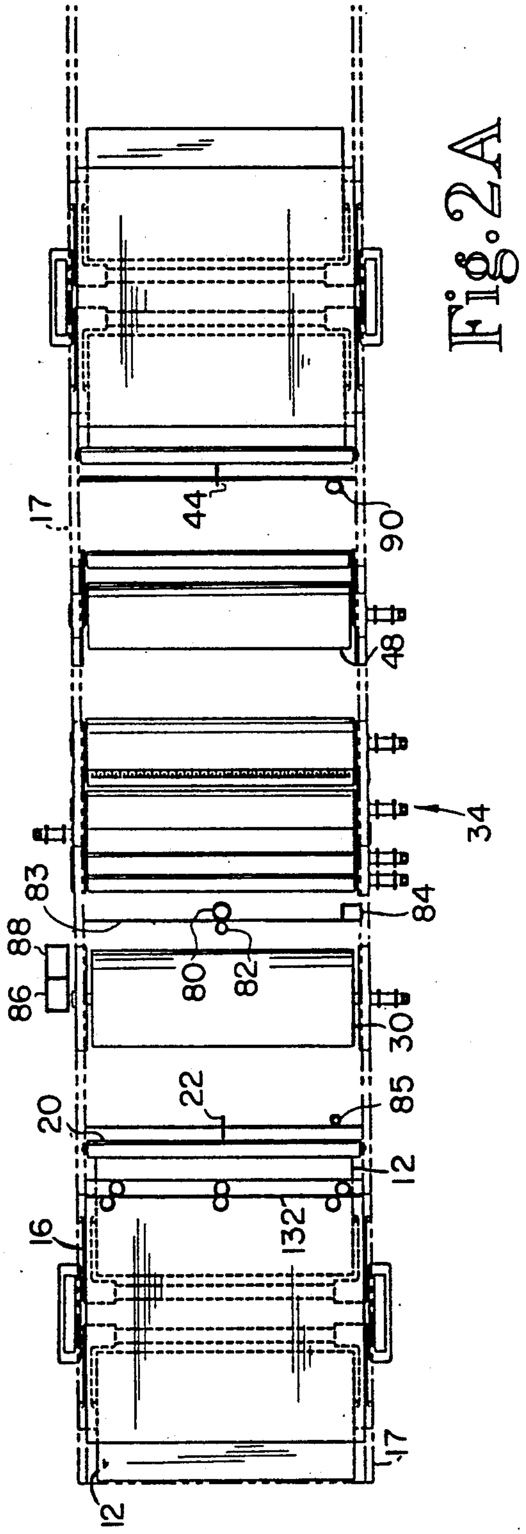
FIGS. 2A and 2B are a top elevational view of a corrugated cardboard manufacturing apparatus according to the present invention.
Figure 2B:
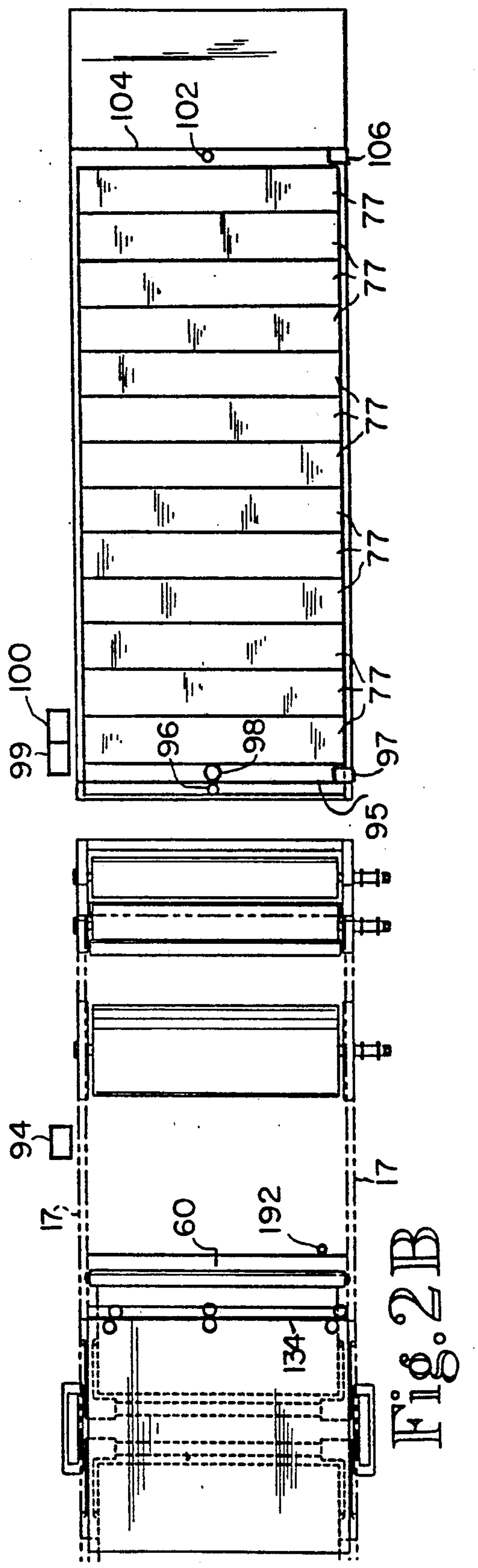

Referring now to FIGS. 2A and 2B, the location of other sensors and devices critical to the operation of the programmable corrugated cardboard manufacturing apparatus according to the present invention are shown. Like numerals between FIGS. 1A and 1B and FIGS. 2A and 2B refer to the same components and are not further described if previously discussed with regard to FIGS. 1A and 1B.

Measurement traversing systems 139 and 137 both include several optical infrared proximity and distance sensors well known in the manufacturing art which aid the processor in locating the edges and center of the web 14 as well as providing information to the processor regarding which zones are active for purposes of activating the steam manifold valves. The exact location of the edges of the web determines the outer movement limits for the moisture and temperature scanning devices, thus the processor must measure the web prior to scanning the web for moisture and temperature information.

Moisture sensor 80 and temperature sensor 82 are mounted on a traversing system 83 which moves the sensors 80 and 82 crosswise over the web according to signals supplied to position drive motor 84. Essentially sensors 80 and 82 may be moved to the extreme edges of the web so that temperature and moisture content of the web may be sensed in all zones or at any location across the web. Paper presence sensor 85 produces a control signal indicative of paper or web present between roller 20 and preheater 30.

Control box 88 is a take-up speed ratio display device and provides a digital readout of the speed differential between the speed sensed by speed sensor 22 and speed sensor 44. The value displayed corresponds to the "take-up" ratio of medium 38 to liner 14 and must be maintained at a particular ratio with a high degree of accuracy to produce good quality corrugated cardboard. A typical value is 1.41 for the take-up ratio. Variances of more than 0.5 percent from this value may result in caliper loss or variances in board thickness. The processor is connected to the control box 88 and monitors the take-up ratio and can signal the operator when the ratio is outside of predetermined upper and lower limits.

Moisture monitor controller 86 is electrically connected with moisture sensor 80 to provide visual information regarding the moisture content of the web at the controller 86 via a digital display. In addition a moisture signal is supplied to a processor from controller 86 representative of the web moisture currently sensed by sensor 80. A suitable moisture sensor and controller are available from Moisture Register Products of Pomona, Ca., model No. BSP901. Temperature sensors suitable for measuring the temperature of the web are available from Raytek of Santa Cruz, Ca., model No. ET3LTSFWC.

Paper presence sensors 90 and 92 function identically to the sensor 85 in providing a signal indicative of the presence of paper or web. Take-up speed ratio display 94 provides information regarding the web speed ratio sensed by speed sensor 60 versus the signal from speed sensor 22. The paper presence sensors are proximity sensors which use infrared light and are well known to equipment designers for sensing the presence or absence of an object.

Another traversing system 95 carries temperature sensor 96 and moisture sensor 98 back and forth beneath the web 72 to sense temperature and moisture of the web 72 as it leaves the double-backer. Position control motor 97 moves the sensors 96 and 98 back and forth across the web in accordance with signals received by the control motor from an external controller or processor. Moisture monitor controller 99 is electrically connected to moisture sensor 98 and includes circuitry for interfacing to a programmable controller or computer and thus supplying the moisture information to the processor or computer.

Take-up speed ratio display 100 provides a take-up speed ratio indicator which reflects the speed of belt 76 versus belt 75 as sensed by speed sensors 108 and 109. A variation from a value of 1.00 for this ratio may result in warped corrugated cardboard. Deviation from a 1.00 ratio usually is attributable to worn drive rollers which drive the belts 75 and 76, thus when the display value varies from 1.00 by two percent or more, the drive rollers should be examined or replaced. Speed monitoring of belts 76 and 75 provides an advance warning of belt wear which is also known as loss of caliper in the belt which can result in tension related warp.

Traversing system 104 moves temperature sensor 102 back and forth across the web to sense web temperature as the web exits the hot plate section 73. Drive motor 106 is controlled by an external device to position the sensor 102 at any position over the web 72. Temperature sensor 102 senses the temperature of the web 72 near the exit point of the machine at location 78. Hot plates 77 span the entire web and are heated by steam passing therethrough (well known in the art) so as to produce heat which is transferred to the web as it passes over the hot plates thereby encouraging curing of the web adhesive.

Figures 3A, 3B:
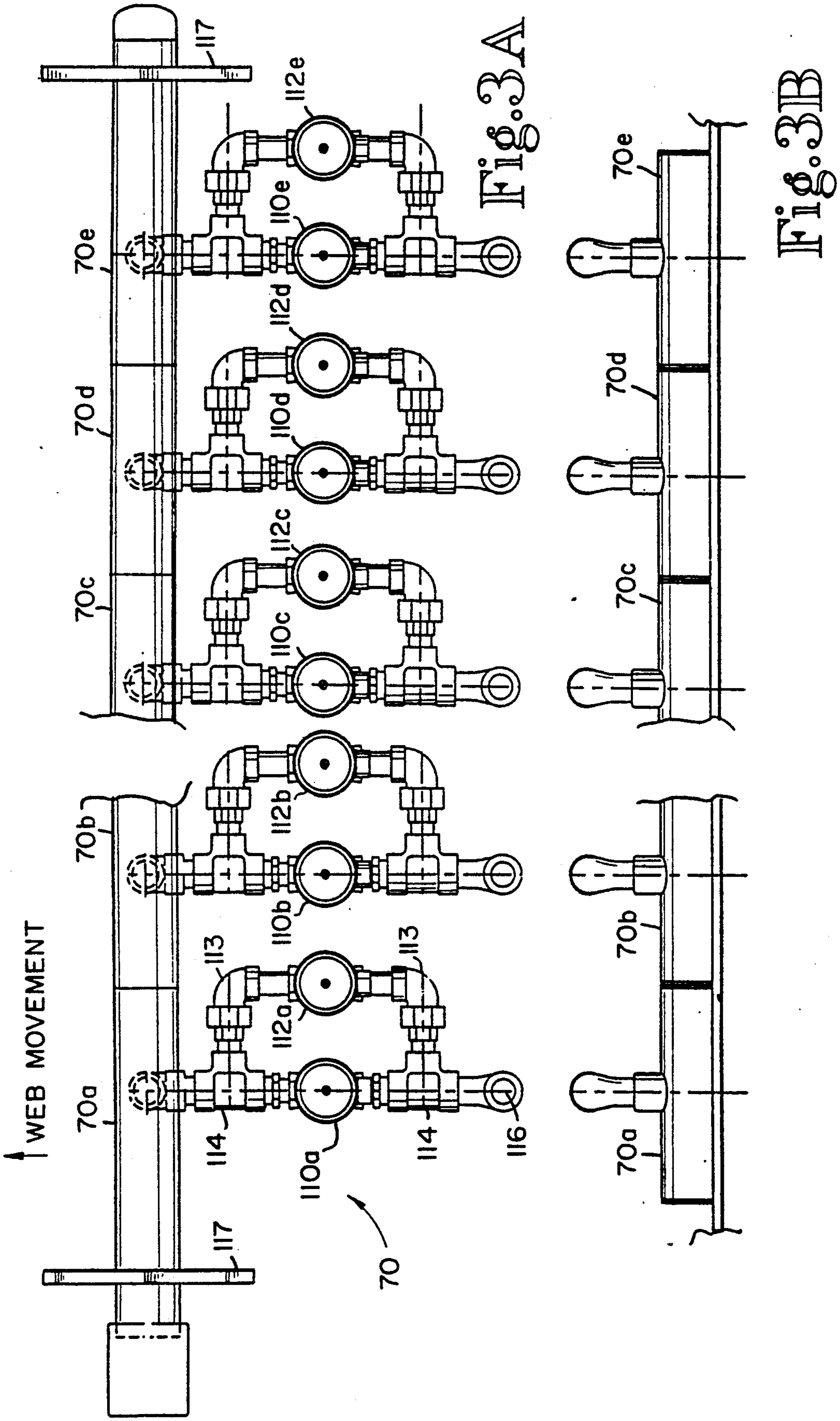
FIG. 3A is a front elevational view of the steam manifold and steam control valves according to the present invention.
FIG. 3B is a front elevational view of a steam manifold according to the present invention.

Referring now to FIG. 3A, a top elevational view of steam manifold 70 is shown. Steam manifold 70 includes various pipe fittings in the form of elbows 113, T-fittings 114, and nipples which interconnect the manifold sections or zones **70*a–e* with a steam supply when valves 110*a–e* and 112*a–e* are actuated, respectively. Pressurized steam at approximately 175 psi is supplied to the valves 110*a–e* and 112*a–e* from steam supply side 116. Valves 110*a–e* and 112*a–e* are solenoid actuated pneumatic valves with flow restriction adjustments unique to each valve such that actuation of valve 110*a* results in a supply of steam to the manifold zone 70*a* at a rate different from that supplied by valve 112*a*. Thus, by varying the combination of actuation of valves 110*a* and 112*a*, three different steam supply rates are realized. In addition, steam manifold 70 is divided into sections or zones so that steam may be supplied to each zone (a–e) of the manifold 70 in a localized manner to dry strips or zones of moisture from the webs 14 and 56 of FIGS. 1A and 1B. End stops 117 define the width of the web which may be received adjacent to steam manifold 70. It is contemplated that valves 110*a–e* and 112*a–e*** may be replaced by a valve having continuously variable flow control in response to an analog activation signal.

Referring now to FIG. 3B, a side view of the steam manifold 70 according to the present invention is shown. It should be apparent that the width of the manifold is limited only by the number of sections of pipe which may be connected end to end to form a steam manifold according to that necessary for a particular job. Manifold zone sections are represented by the sections **70*a–e*** which may be sections of pipe connected together yet individually sealed to localize drying of the web beneath each individual section of the manifold.

Figure 4:
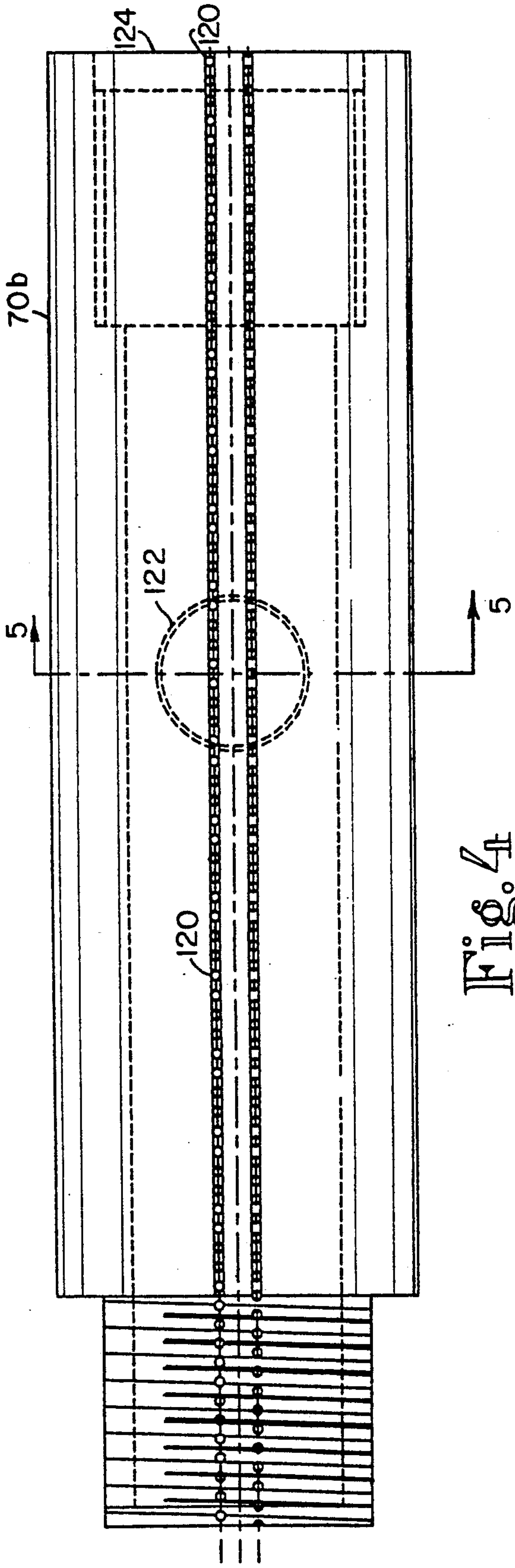
FIG. 4 is a detailed view of one section of the steam manifold shown in FIG. 3A.

Referring now to FIG. 4, a more detailed view of the steam manifold section **70*b* is shown. A series of holes are drilled in the pipe along the full length of the pipe so that the holes 120 will allow steam within the pipe to pass out of the pipe. In addition, the steam supply valves 110*b* and 112*b* are connected via fittings to the drilled and tapped hole 122 (shown by broken lines). Essentially, steam manifold section 70*b* is a piece of pipe having threads at each end for connection with like pieces of pipe having mating threads. At the end of each section 70*b*, in the area of 124 the pipe 70*b* is sealed off from the adjacent pipe section so that steam supplied to each particular section of the steam manifold 70 dries only a particular zone or strip of the web which passes adjacent the holes 120**.

Figure 5:
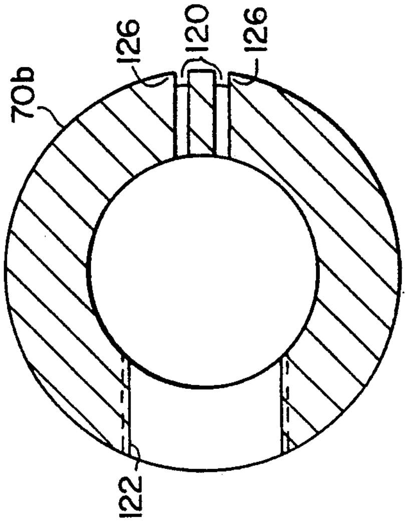
FIG. 5 is a cross-sectional view of the steam manifold section of FIG. 4 looking in the direction of the arrows labeled 5.

Referring now to FIG. 5, a cross section of the manifold section **70*b* looking in the direction of arrows 5 in FIG. 4 is shown. As can be seen, the hole 122 enables piping connection to the steam supply valves 110*b* and 112*b*. In addition, the cross sectional view shows the holes 120 which are recessed in a groove 126 thereby enabling equalization of the steam throughout the groove or channel 126 when steam is supplied to the section 70*b***.

Figures 6A, 6B:
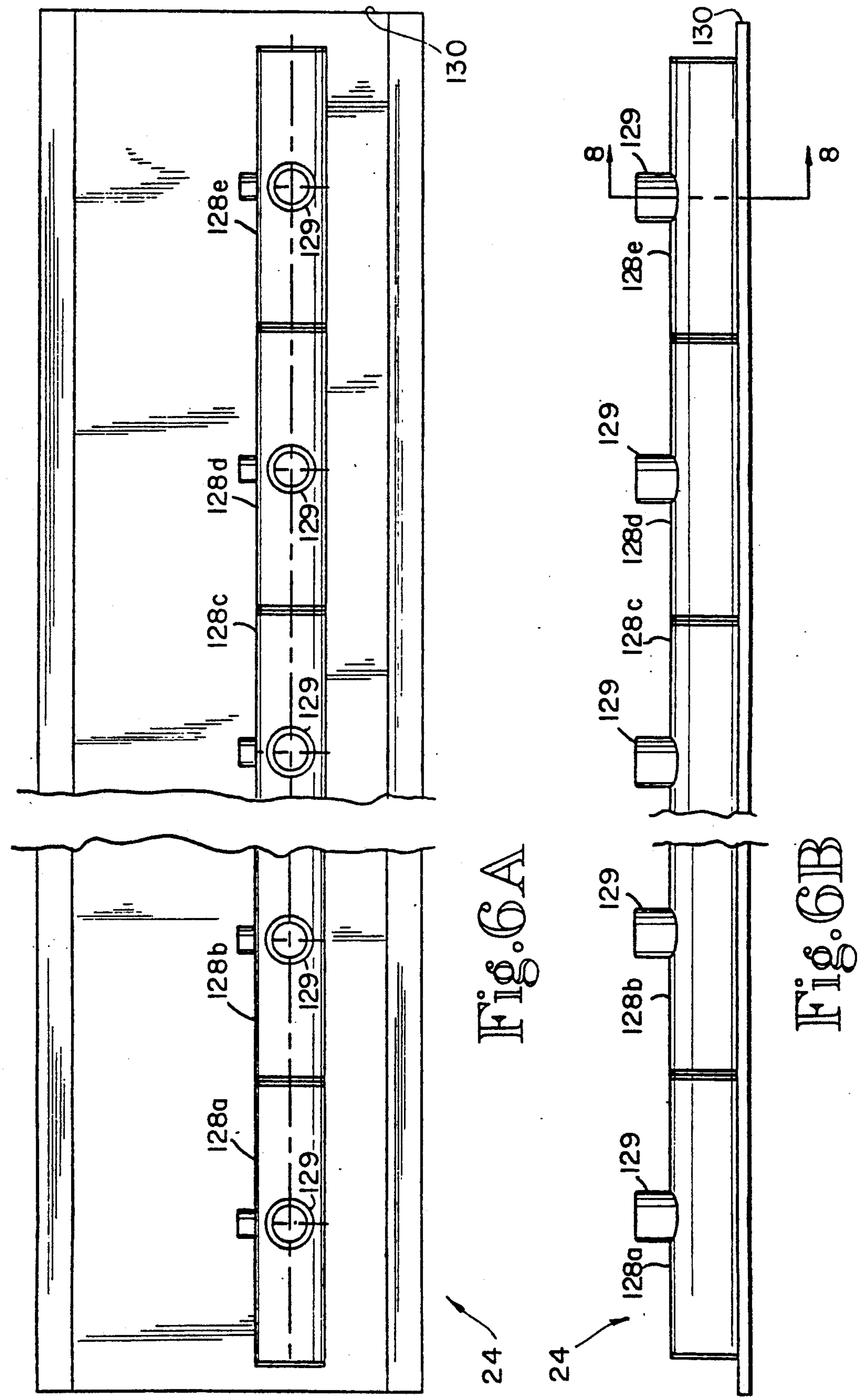
FIG. 6A is a top elevational view of another steam manifold according to the present invention.
FIG. 6B is a front elevational view of the steam manifold of FIG. 6A.

Referring now to FIGS. 6A and 6B, another embodiment of the steam manifold is shown. This particular embodiment corresponds to the steam manifold 24 shown in FIG. 1A. A series of steel steam boxes **128*a–e* are shown which interconnect at fittings 129 to individual dual valve steam supply pipes as shown in FIG. 3A. Thus, each steam box 128*a–e* has its own individual steam supply controlled by two different valves which provide three different levels of steam drying capability and a fourth state of operation wherein no steam drying is supplied. The steam that emanates from the manifolds must be pressurized to at least 100 psi and no higher that 200 psi to provide the appropriate drying capability for removing moisture from the web. Each of the steam boxes 128*a–e* is mounted or attached to a steel plate 130** which is preferably wider than the web in contact therewith.

Figure 7:
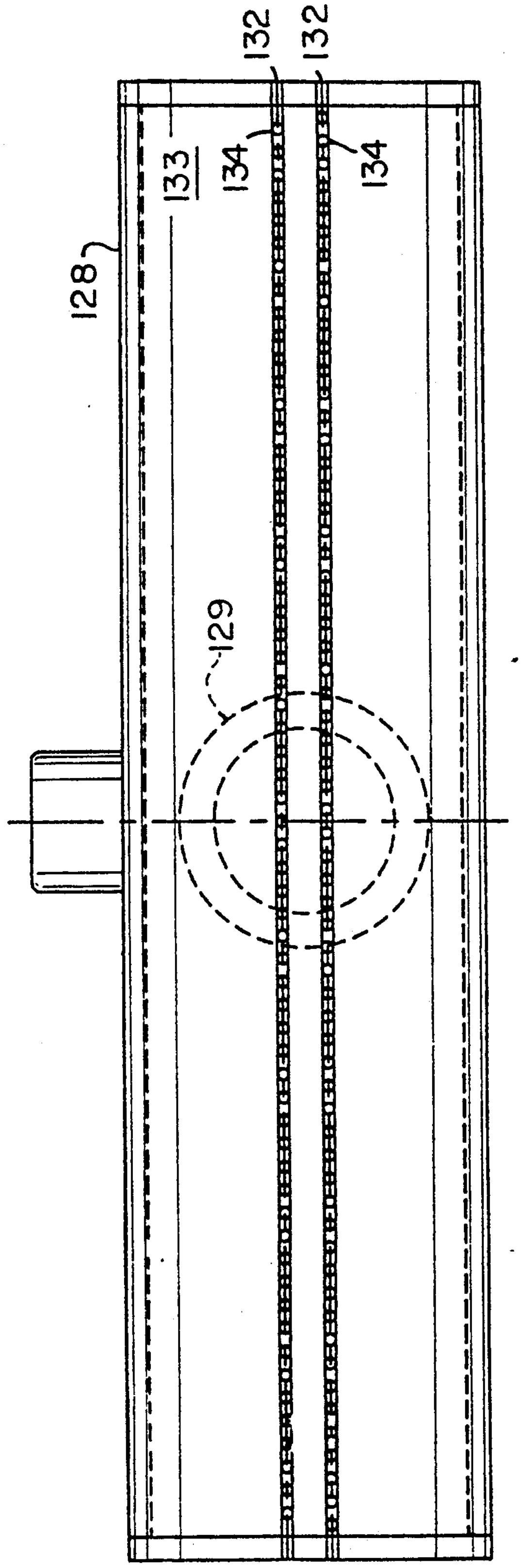
FIG. 7 is a top elevational view of the steam box of FIG. 6A showing the two rows of steam apertures therein.

Referring now to FIG. 7, a more detailed view of steam box 128*a* is shown. Each steam box 128 includes two grooves 132 wherein a series of holes 134 are drilled through the steam box enclosure to allow steam to pass from the inside area of the box into the web which is situated adjacent the surface 133.

Figure 8:
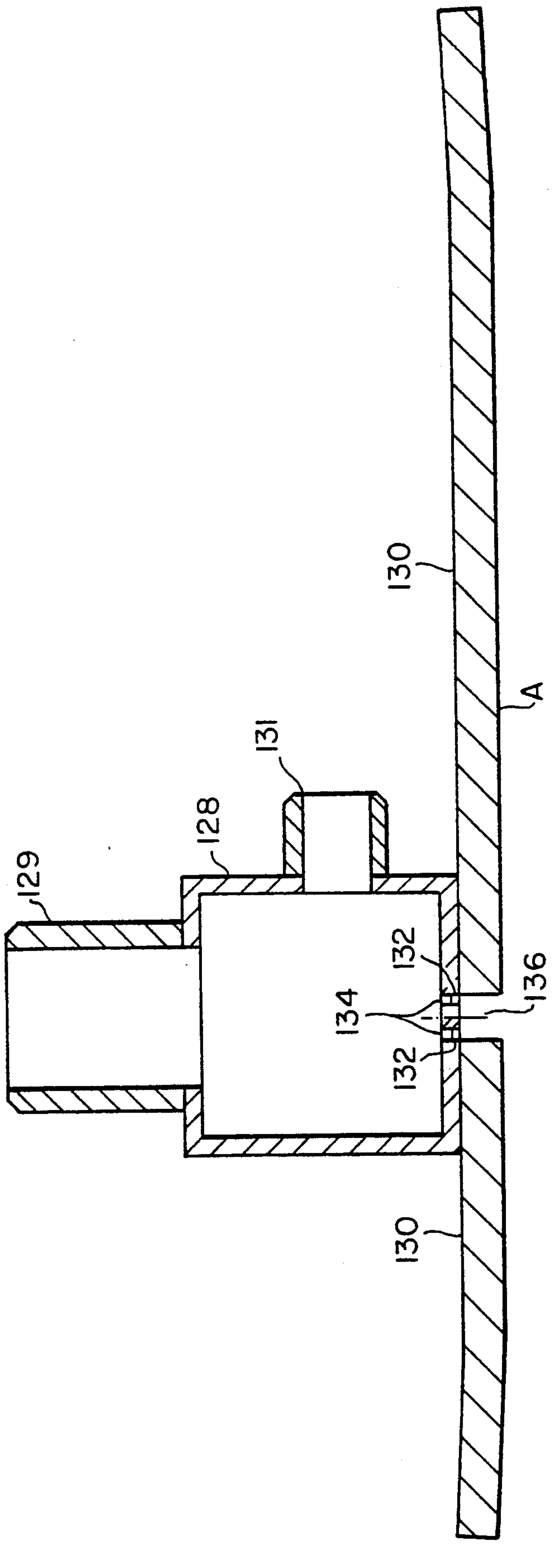
FIG. 8 is a cross sectional view of the steam manifold shown in 6B looking in the direction of the arrows labeled 8.

Referring now to FIG. 8, a cross sectional view of the steam manifold 24 looking in the direction of the arrows labeled 8 in FIG. 6B is shown. The steam box 128 includes a portion 129 for attachment to the steam supply and another fitting 131 for attachment to a condensate drain line. A channel 136 communicates with the inner portion of box 128 so that when steam is supplied to box 128 the steam passes through holes 134 and grooves 132 into channel 136, which is adjacent to the web as it passes along side A of plate 130.

Figure 9:
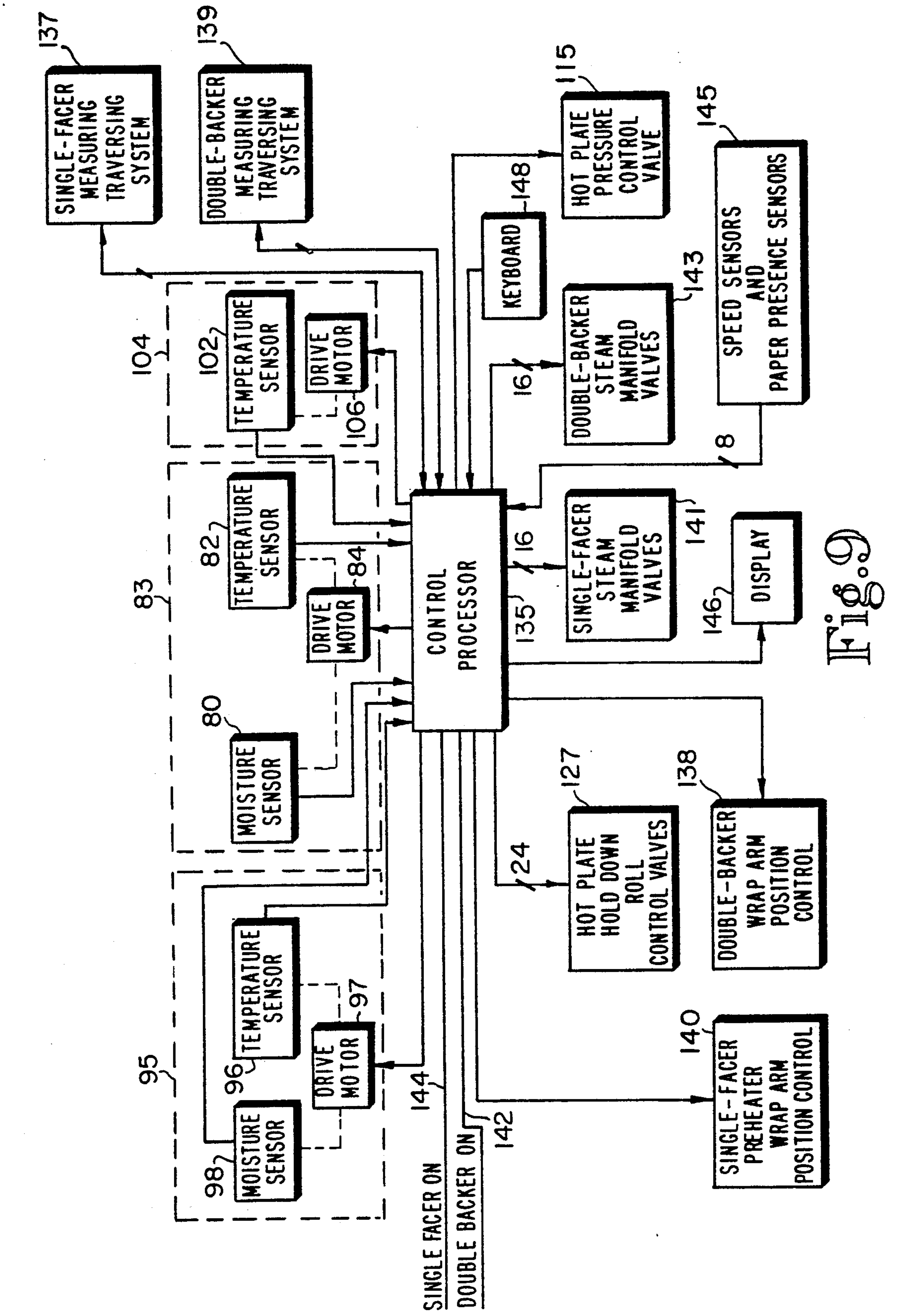
FIG. 9 is a block diagram of the corrugated cardboard programmable controller system according to the present invention.

Referring now to FIG. 9, a block diagram of the corrugated manufacturing apparatus programmable controller system according to the present invention is shown. The heart of the system is a control processor 135 which is typically a programmable logic controller device. The processor 135 has analog input and output capability as well as digital input and output capability to interface with a variety of devices providing input information regarding process parameters and for controlling devices via output signals. A programmable logic controller (plc) manufactured by Allen Bradley model No. PLC5/25 is suitable for the present invention.

Processor 135 controls drive motor 97 to move moisture sensor 98 and temperature sensor 96 back and forth across the web. The traversing system 95 is comprised of the drive motor 97, moisture sensor 98, and temperature sensor 96 and its physical location is shown in FIG. 2B. Signals from the moisture sensor 98 and temperature sensor 96 provide input information regarding moisture content and temperature of the web as the web leaves the double-backer 52. As is shown in FIG. 1B, the moisture sensor 98 and temperature sensor 96 are angled upwards at approximately forty-five degrees from horizontal to view the web 72 as it emerges from double-backer 52. Open loop position sensing of sensors 96 and 98 is achieved with traversing system 95 using a center position sensor and adjustments of the motor 97 speed so that a specified delay time corresponds to movement of the sensors a predetermined distance across the web. Traversing systems 83 and 104 include similar position determination hardware and operating characteristics. It is also contemplated that motors 84, 97, and 106 may include shaft encoders to provide absolute feedback position information calculable based upon the mechanical drive system employed to move the sensor, such as ball-screw or chain-pulley mechanical drive systems.

Processor 135 also receives moisture and temperature information from moisture sensor 80 and temperature sensor 82. Sensors 80 and 82 are moved back and forth across the web by drive motor 84. The sensors 80 and 82 and drive motor 84 comprise the traversing system 83 which is also shown in FIG. 2A positioned above the web between the preheater 30 and the single-facer 34.

Figure 15:
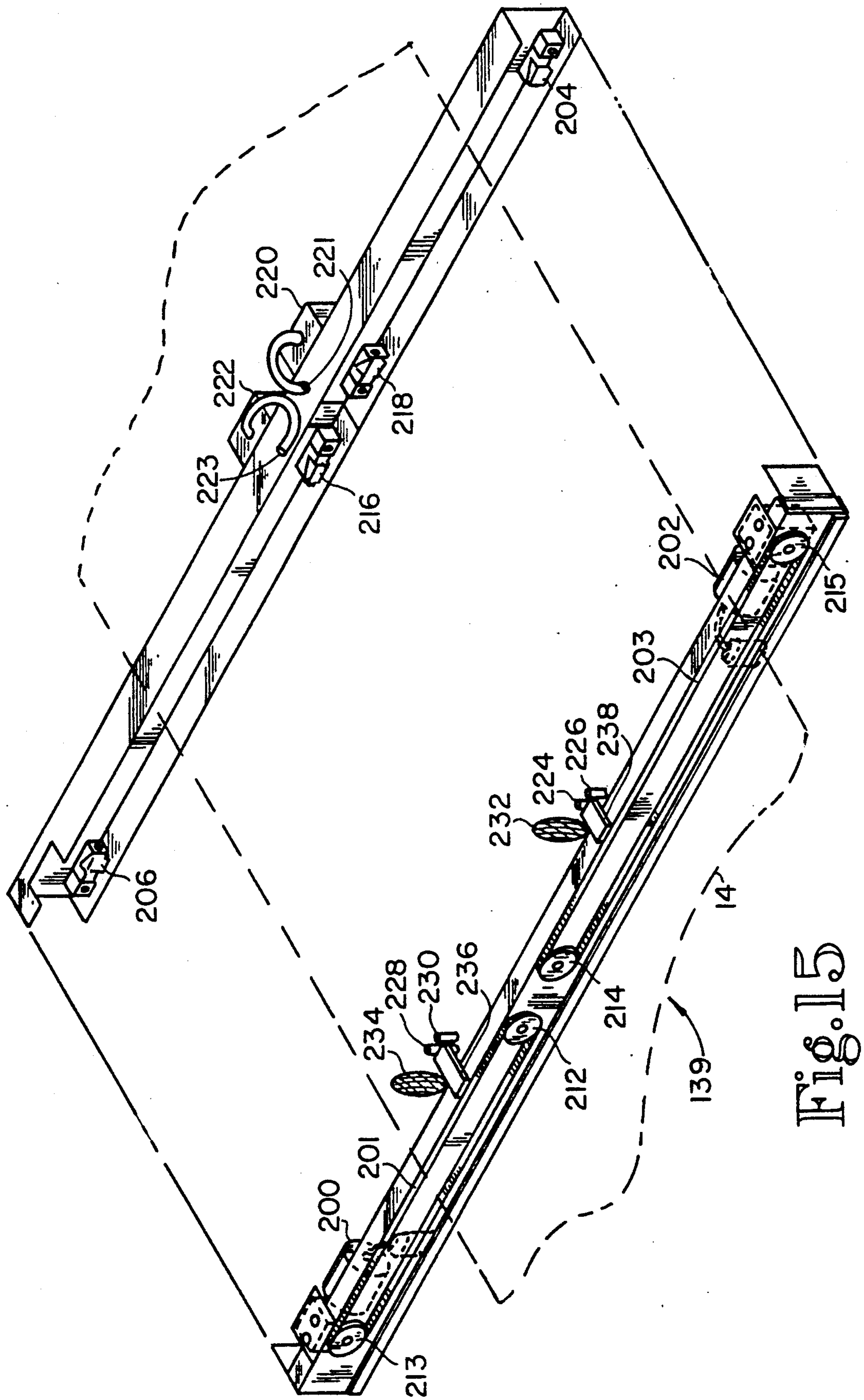
FIG. 15 is an exploded isometric view of a traversing measurement system for detecting the width and edge locations of the paper web.

Another traversing system 104 which includes temperature sensor 102 moves back and forth across the web to sense temperature at all points across the web as the corrugated cardboard emerges from the hot plate section 73 of the machine. Traversing system 104 is also shown in FIG. 2B. Processor 135 provides drive signals to drive motor 106 to move the temperature sensor 102 back and forth across the web. Single-facer traversing measurement system 137 and double-backer traversing measurement system 139 (both of which are shown in FIG. 2A and 2B and FIG. 15) include sensors which provide signals to the processor 135 for detection of the edge of the web and thus the width of the web as well as to determine whether the web is centered in the machine or is installed at an offset position from the center of the machine. This information is used by processor 135 in order to control traversing systems 83, 95, and 104 and interpret data appropriately up to the edge of the web and ignore data that is sensed or received from the sensors if the traversing systems 83, 95, or 104 are beyond the edge of the web.

The single-facer preheater wrap arm control is represented by block 140. The control processor 135, in response to signals from temperature sensor 82, positions the wrap arm 28 accordingly so that the web 14 leaving the preheater 30 is within a predetermined temperature range. Processor 135 supplies signals to the wrap arm position control device 140 to position the wrap arm 28 appropriately. In a similar fashion, the double-backer wrap arm position control 138 is controlled by processor 135 according to signals received from the temperature sensor 96. When the temperature sensor 96 indicates that the average temperature should be increased, the wrap arm position control 138 is activated to position the wrap arm 64 so that the liner or web 56 is preheated to the appropriate predetermined temperature range prior to entering the double-backer 52.

The single-facer steam manifold valves 141 are controlled directly by processor 135 in response to information concerning each zone of the web ascertained from moisture sensor 80. In response to moisture information from sensor 80 indicating unequal moisture across the web 14, processor 135 energizes the appropriate valves of block 141 so that the moisture content in each zone across the web is equalized at or within one percent of the average moisture content across the liner web. Ideally, the moisture content across the web should be within plus or minus one percent of a fixed moisture level.

Similarly, the double-backer steam manifold valves 124, of which there are sixteen if the web is divided into eight monitoring zones, which control steam delivery to the eight steam boxes. Each zone is individually controlled to one of four steam delivery rates: none, low, medium, and high. Processor 135 energizes any combination of the sixteen valves present in block 143 in order to equalize moisture in the web 56 before it enters the double-backer 52 as shown in FIG. 1B. As previously discussed, each steam box or section of the steam manifold has two valves which control steam to that particular portion of the steam manifold or zone. Therefore, by restricting the flow rate of one valve which supplies the same box versus the flow rate of the other valve supplying the same steam box, at least three different flow rates can be achieved by energizing one valve, the other valve or both valves simultaneously for that particular steam box.

Processor 135 also controls the steam pressure supplied to the hot plates 77 beneath the hot plate section 73 of the machine. The hot plates 77 in FIG. 2B provide heat to the corrugated cardboard for curing the adhesive. Operationally the processor 135 monitors the temperature across the web 72 using sensor 102 and drive motor 106 which are components of traversing system 104. In response to detection of abnormal temperatures the processor has two different options. The first is to raise or lower additional hold down rolls by opening or closing additional control valves 127 which supply air pressure to air cylinders mechanically coupled to the hold down rolls 74. The 24 hold down rolls are individually raised or lowered according to the twenty-four control valves of block 127. Alternatively, processor 135 can vary the pressure to the hot plates via control valve 115, thus a combination of varying the number of hold down rolls which are actively engaged via the control valves 127 and varying the pressure control valve 115 result in a heat regulation technique wherein the processor can use both of these devices to more rapidly equalize the heat transfer to the web and more quickly regulate process control parameters in the hot plate section 73.

Control signals from the single-facer 34, on signal path 144, and from the double-backer 52, signal path 142, provide the processor 135 with input signals representing whether those devices are currently active or running. Unless the signals present on signal paths 144 and 142 indicate that the single-facer 34 and double-backer 52 are running, the processor 135 will not execute any control routine for the various devices subject to its control.

Web speed signals from sensors 22, 44, 60, 108, and 109 and paper present signals from sensors 85, 90, 92, are provided to processor 135 via the representation of block 145. Web speed signals are monitored for proper take-up ratios as well as detecting movement of the web. The processor must see proper paper presence signals and web speed before enabling operation of the valves 141 and 143.

Software for implementing the control routines for the corrugated cardboard manufacturing apparatus according to the present invention includes the routines of FIGS. 10, 11, 12, and 13 for each single-facer or double-backer implemented, i.e. each single-facer will include a set of routines corresponding to those shown in FIGS. 10–13 in the programmable logic controller and another set of these routine will simultaneously be executing for each double-backer. The following description will describe the application to the single-facer 34 but is equally appropriate to the double-backer 52.

Figure 10:
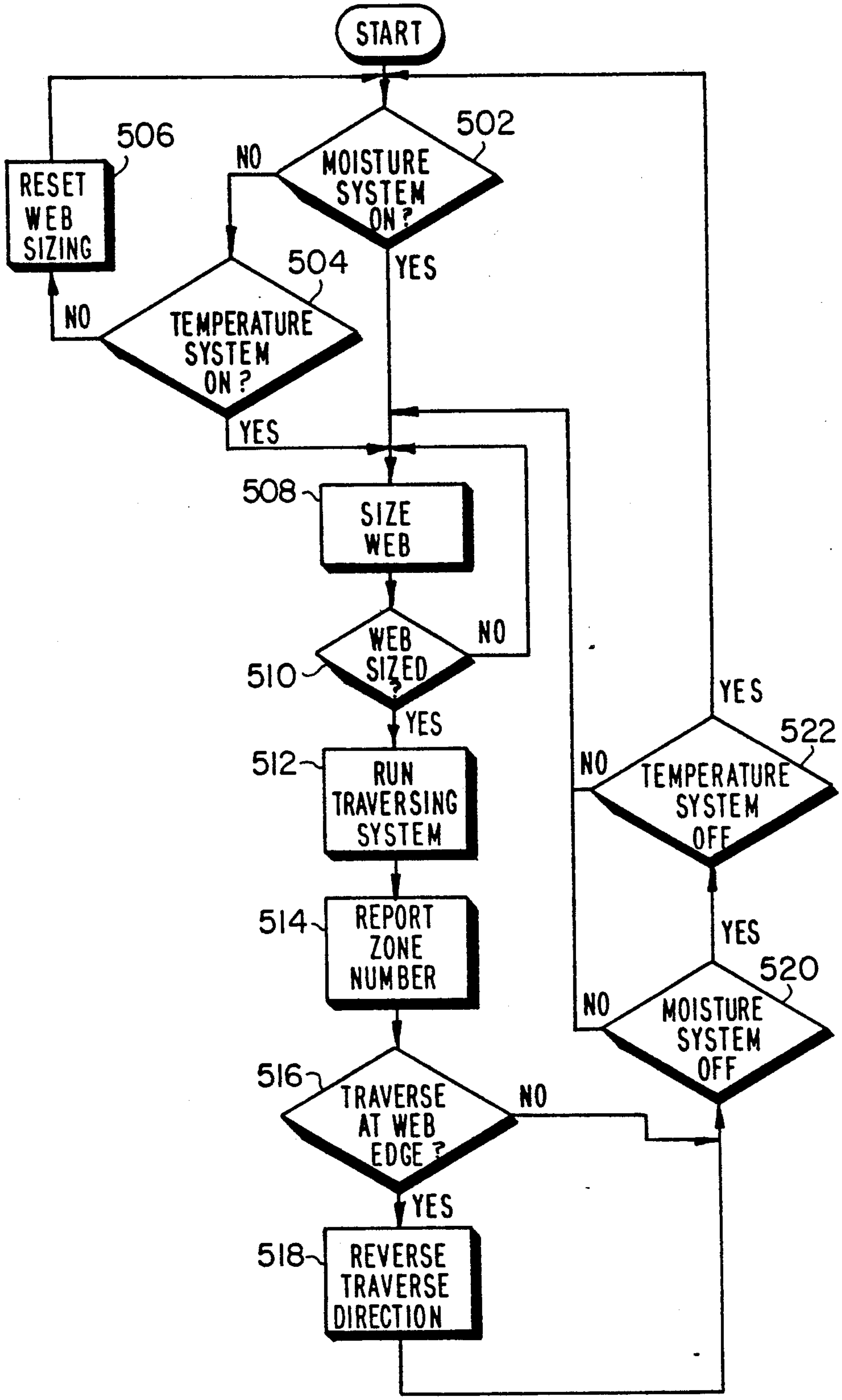
FIG. 10 is a flowchart of the software routine which controls the traversing systems and detecting moisture and temperature across the web.

Referring now to FIG. 10, a flowchart for controlling the transversing system (83 or 95) and detecting moisture and temperature across the web (14 or 72)is shown. At step 502 the programmable controller or processor checks certain input which are connected in parallel with the power supply signals supplying power to the moisture and temperature sensors. If power to the moisture system is not on, program execution continues at step 504 where the processor determines whether or not the temperature system is on by monitoring an input signal connected in parallel with the temperature system power input signal. If the temperature system is not on, program execution continues with step 506 and the web sizing hardware is positioned at the outer limits of travel enabling the operator to thread new paper into the single-facer or double-backer devices or perform maintenance procedures. If at step 502 or 504 the answer is yes, program flow continues at step 508 where the web is sized for width by actuating motors and moving optical sensors back and forth across the web to determine where the edges and center of the web are located.

After the web has been sized at step 508 and the processor stores the edge and center values in memory, program execution continues at step 512 from step 510. If the web is not sized or measured yet, program execution returns to step 508 from step 510 until the web is sized. At step 512, the controller begins running the traversing system moving the temperature and moisture sensors back and forth across the web. During that time the position of the sensor is determined based upon the time delay of moving the sensor from the center of the transversing system to the edge of the web. The processor receives an input signal from the traversing system indicating when the temperature and moisture sensors are over the center position of the traversing, thus providing a feedback positioning signal to the processor as to sensor location, and enabling detection of signals to correspond to zones of the web, which also directly relates to zones of the steam manifold devices. At step 514, information corresponding to each zone of the web is recorded with regard to temperature and moisture. At step 516 the controller determines whether or not the traversing system is at the edge of the web and if it is, the position control motor (84 or 97) of the traversing system is reversed to move the sensors to the opposite edge of the web. If the traversing system is at the edge of the web, then the traversing system direction is reversed at step 518 and program execution continues at step 520. If at step 516 the processor determines that the sensors are not at the edge of the web, program execution continues at step 520. At step 520 the programmable controller examines the moisture system and if the moisture system is off, program execution continues at step 522. If at step 520 the moisture system is determined to be on, program execution continues at step 508. Similarly, at step 522 if the temperature system is off, program execution will continue at step 502. However, if the temperature system is on, program execution will continue at step 508 from step 522.

Figure 11:
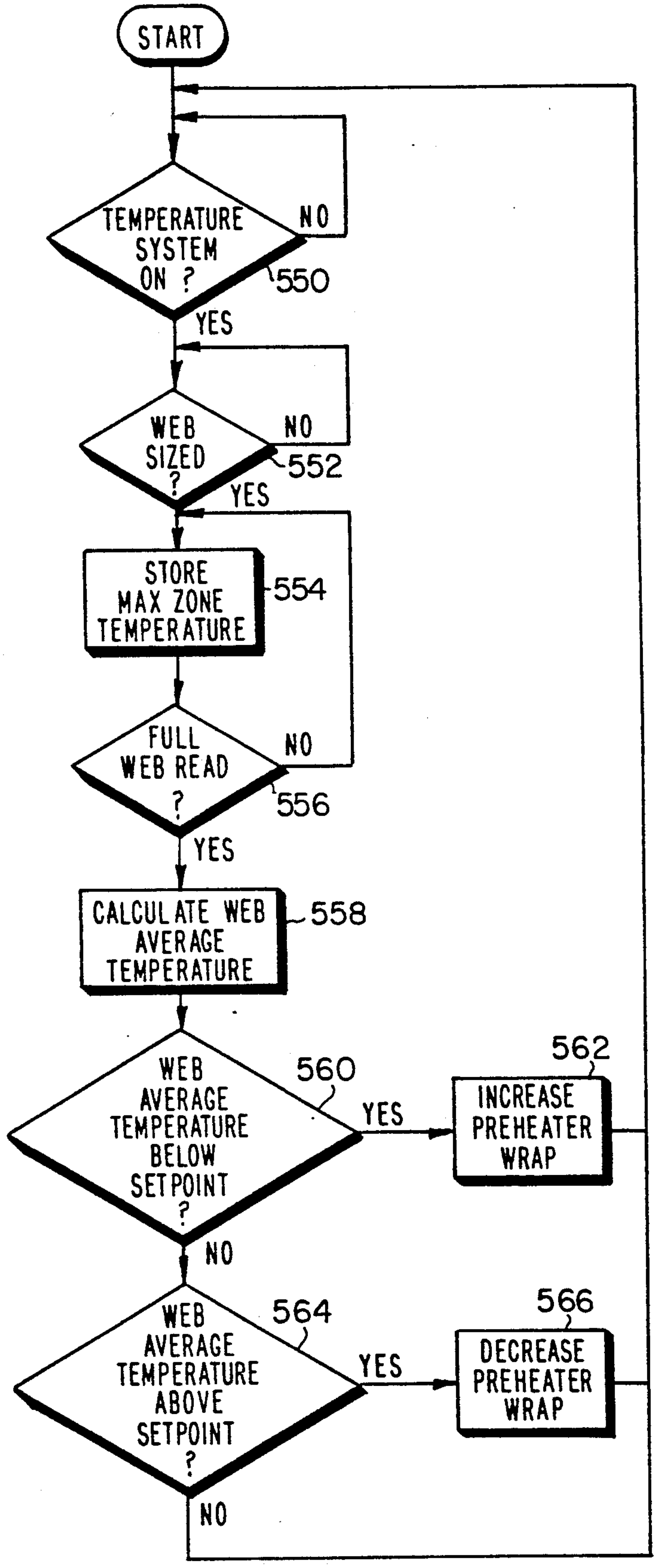
FIG. 11 is a flowchart of the software routine which controls the position of wrap arms of the preheaters according to the temperature of the web.

Referring now to FIG. 11, a flowchart for the wrap arm position control routine is shown. The programmable logic controller at step 550 determines if the temperature system is on by interrogating the temperature sensor (82 or 96). If the result is "no", the program will loop on itself at step 550 until the temperature system is determined to be on. After the temperature system is on, program execution continues with step 552 where the programmable controller determines if the web has been sized, i.e. has the traversing measurement system been activated and the edge and center of the web detected. If not, program execution loops at step 552 until the web has been sized. After the web has been sized, program execution continues at step 554 where the processor stores the maximum zone temperature of all the zones that have been tested by routine. Thereafter, program execution continues with step 556 where the processor or controller tests whether the entire web, i.e. all zones across the web, have been sensed for temperature. If not, program execution returns to step 554 where the maximum zone temperature is stored. If at step 556 the full web has been read, i.e. a temperature has been recorded for each zone across the web, then program execution continues with step 558 where the controller calculates the average temperature across the web. Thereafter, at step 560 the web average temperature is tested against a predetermined programmable range and if it is below the lower limit, the preheater wrap is increased at step 562 so as to increase the temperature of the web. However, if the web temperature is above the range, then program flow after step 560 continues with step 564 and the controller tests whether the average temperature across the web is above the upper limit set point or range. If not above the upper set point, program execution continues at step 550. If temperature is above the upper set point the wrap on the preheater arm is decreased at step 566. From steps 562 and 566, program execution continues at step 550.

Figure 12:
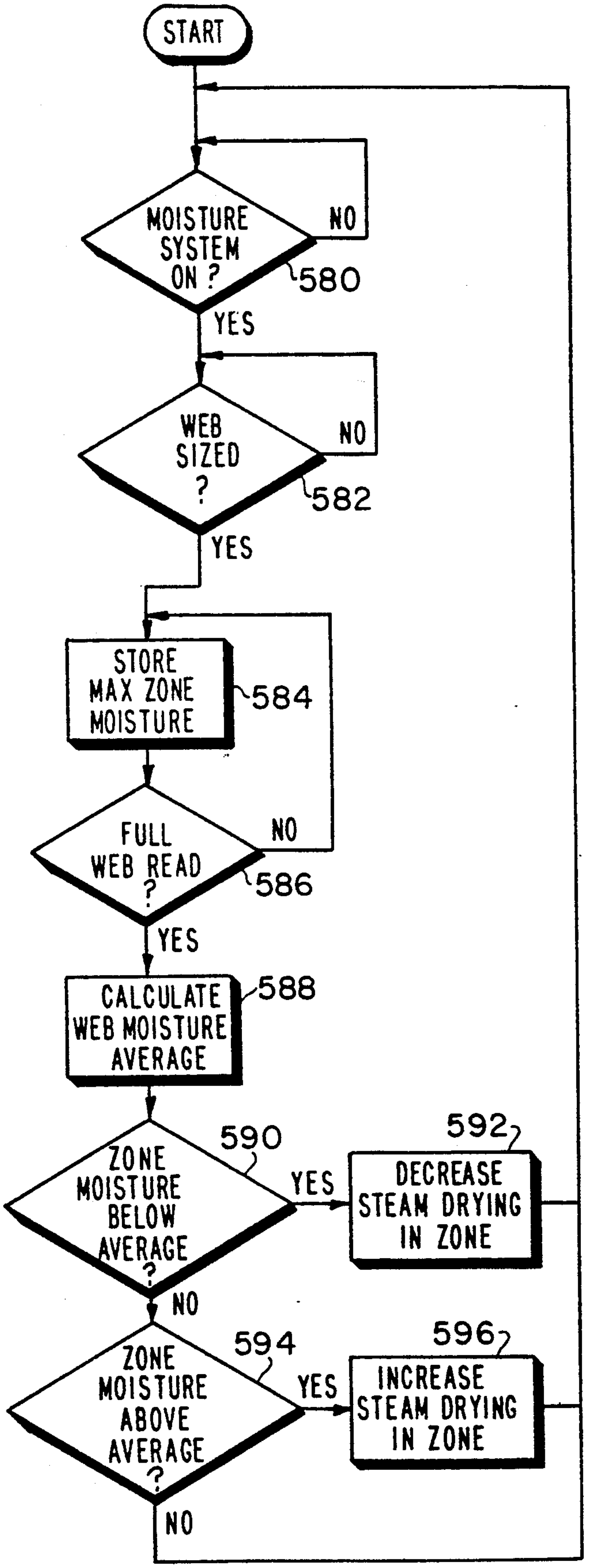
FIG. 12 is a flowchart of the software routine which controls activation of the steam supply valves of the steam manifold to reduce moisture content across the web in response to sensed moisture.

Referring now to FIG. 12, a flowchart for the software routine which controls the valves and thus the steam drying action of the steam manifold is shown. At step 580 the controller tests whether power is being supplied to the moisture system. If the moisture system is not on, the program loops on itself at step 580 until the moisture system is determined to be on. Thereafter, program execution will continue at step 582 and loop upon itself at step 582 until the web has been sized fully, i.e. the traversing system has moved the sensors from one edge of the web to the other and determined the size of the web and the center of the web. Once the web size has been determined at step 582, program execution continues at step 584 where the programmable controller stores the maximum zone moisture reading. At step 586 the controller determines whether or not the entire web, i.e. all zones of the web have been read or whether a moisture reading is in memory with regard to each zone of the web. If at step 586 all zones have not been read with regard to moisture, program flow returns to step 584 with the next information regarding the next adjacent zone tested for moisture content. After all zones of the web have been read, program execution continues at step 588 from step 586 wherein an average of moisture content of the web is calculated. Thereafter at step 590, if the zone moisture for a particular zone is below the set point desired, program execution will continue at step 592 where steam drying in that particular zone is decreased or deactivated. On the other hand, if the zone moisture is not below average but is above average then program execution will continue from step 590 at step 594 and if the zone moisture is above the average or predetermined set point, the steam drying action in that zone is increased by controlling the steam manifold valve for that zone to deliver more steam at step 596. If zone moisture is not above average at step 594 then program execution will continue at step 580. Likewise, from steps 592 and 596 program execution continues at step 580.

Figure 13:
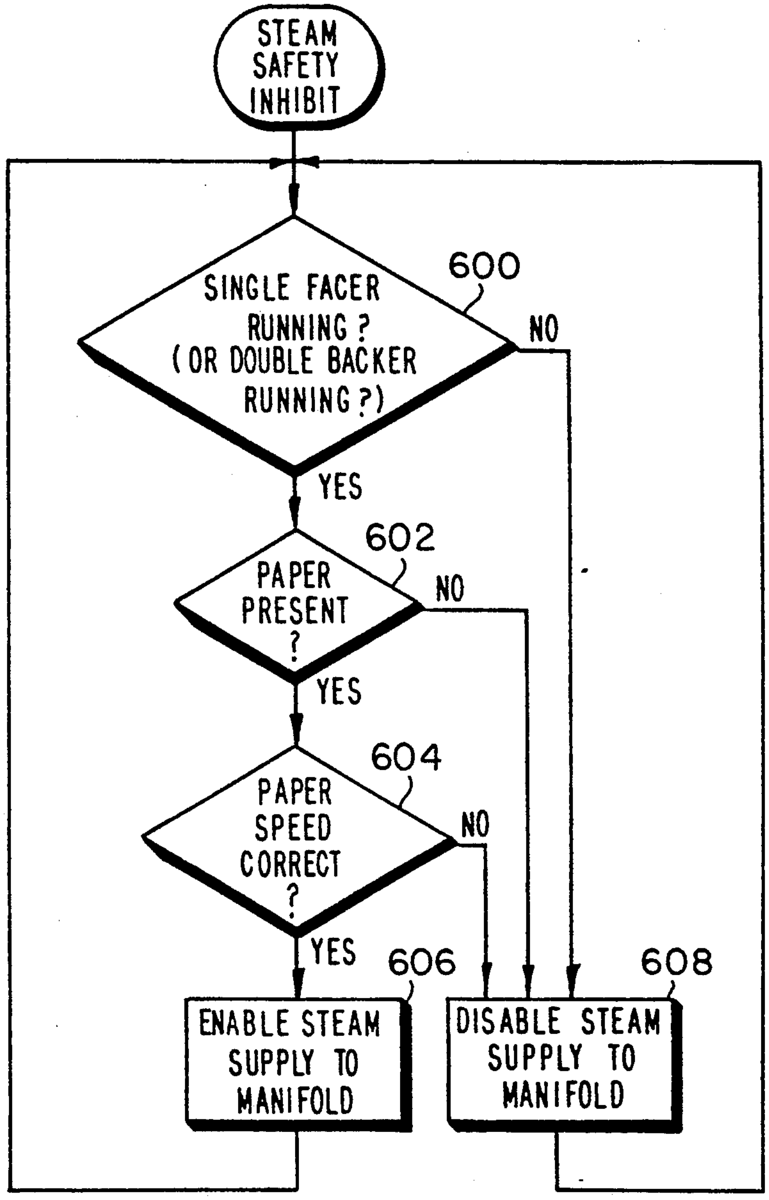
FIG. 13 is a flowchart for the steam safety inhibit software routine which prevents steam from being supplied to the steam manifolds if paper is not present or moving over the manifold.

Referring now to FIG. 13, a flowchart for the steam safety inhibit software routine is shown. Essentially, the routine shown is intended to prevent release of steam through the steam manifolds if the single-facer or double-backer devices are not currently functioning. The paper presence sensor 85 and the speed from the speed sensor 22 are monitored in this routine whether or not the paper is present and moving over the manifolds. More specifically, at step 600, the controller determines whether or not the single-facer or the double-backer is running via signals from those devices (on signal paths 142 or 144). If the tested device is not running, then program execution continues at step 608 where the steam supply to the manifold is disabled. If the single-facer is running (or alternatively the double-backer is running) at step 600, then program execution continues with step 602 wherein the paper presence sensor is monitored to determine if paper is present over the manifold. If paper is present, then execution continues with step 604. Alternatively, if there is no paper detected at step 602, then the steam supply to the manifold is disabled at step 608 and program execution will return from step 608 to step 600. At step 604 the controller determines whether or not the paper speed is acceptable or suitable for enabling steam. Such a speed may be anything other than zero, or a web speed greater than a predetermined set point or minimum speed. If the speed is correct, then program execution continues at step 606 wherein internally the controller enables activation of the solenoid valves which supply steam to the steam manifolds. If at step 604 the paper speed is incorrect or not sufficient, then program execution continues after step 604 at step 608 wherein the valves (**110*a–e* and 112*a–e*) and thus the steam supply to the steam manifold are disabled. After step 608, program execution continues at step 600**.

Figure 14:
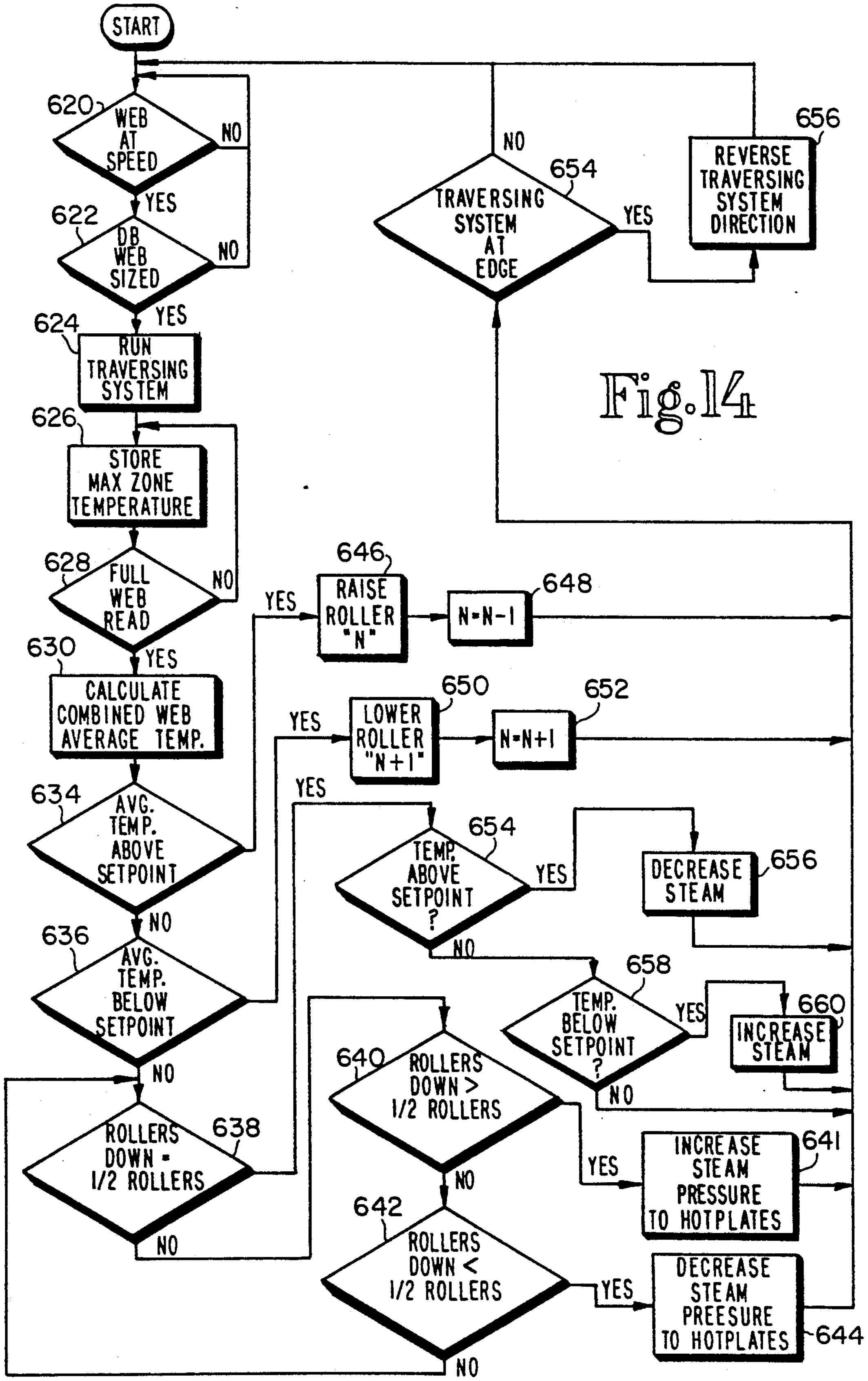
FIG. 14 is a flowchart of the software routine which controls hot plate temperature and roller position in the hot plate section of the corrugator manufacturing apparatus.

Referring now to FIG. 14, a flowchart for the software routine which monitors web (72) temperature and controls steam supplied to the hot plates (77) and roller (74) vertical position is shown. At step 620 the controller tests to see if the web is up to speed via inputs from any of the various speed sensors. If the web is not running at the appropriate speed according to the speed sensors (108 or 109) then program execution loops on itself at step 620. If the web is up to speed at step 620, then program execution continues at step 622 where the controller determines whether or not the web has been sized. If the web has been sized then program flow continues at step 624 and the controller begins to run the traversing system (104) moving the temperature sensor back and forth across the web. If at step 622 the web has not been sized yet, then program execution returns to step 620. After step 624, at step 626, the controller stores the maximum zone temperatures sensed by the traversing system activated at step 624. At step 628, following step 626, the controller determines whether or not all zones of the web have been read for temperature. If not, program execution returns to step 626. If all zones of the web have been read then program execution continues from step 628 to step 630. At step 630, the combined web average temperature is calculated by the controller and if the average temperature is more than 5° above a predetermined set point or limit at step 634, then program execution continues with step 646 wherein the next roller to be raised (beginning from the rear 78 of the machine, the rollers are lowered) is raised and the roller counter is decremented at step 648. Thereafter, program execution continues at step 654. If at step 634 the average temperature is not above the set point then program execution continues with step 636 where the program tests whether or not the average temperature of the web is more than 5° below the set point or predetermined limit. If the average temperature of the web is more than 5° below the set point of step 636, program execution continues at step 650 and another roller is lowered and the roller counter is incremented at step 652. Thereafter, program execution continues with step 638.

If at step 636 the average temperature is not below the set point then program execution continues at step 638. In step 638, the programmable controller examines its memory and I/O and determines whether or not half the rollers are down. If half are down (and half are up) then program execution continues at step 654. The web temperature is compared to a predetermined range or set point at step 654 and if the web temperature is above the predetermined value then the steam supply to the hot plates is decreased at step 656. If the web temperature is below the set point at step 654, then the web temperature is compared with the lower range limit or set point at step 658. It follows then that the steam supply is increased at step 660 if the test in step 658 is answered in the affirmative.

If a quantity other than half the rollers are currently in the down position at step 638 then the programmable controller continues at step 640 wherein it tests as to whether or not the number of rollers down is greater than half. If so, then the steam pressure to the hot plates is increased an incremental amount at step 641. If the number of rollers is not greater but rather less than half the number of rollers, then from step 640, program execution continues at step 642. If the number of rollers that are down is less than half the rollers then program execution will continue from step 642 at step 644 and the steam pressure supplied to the hot plates will be decreased slightly. At step 642 if the number of rollers down is not less than half the rollers then program execution will return to step 638. From steps 644, 641, 652, 648, 656, 658, and 660 program execution continues at step 654 wherein the controller tests whether or not the traversing system (104) is at the edge of the web. If at the edge of the web, then the direction of movement of the traversing system is reversed at step 656. If not at the edge of the web, then program execution continues at step 620 after step 654. Likewise, program execution continues at step 620 after step 656.

The objective in positioning the rollers 74 so that half of the rollers (the half nearest location 78) are down and half (the leading half with respect to the web movement) are up is to maintain the largest capability for effecting a maximum temperature change in the web 72 if only rollers are moved and the steam supply to the hot plates 77 is not changed. Ideally, the steam supply to the hot plates is always adjusted so that only half of the rollers are down or up thus providing more rapid closed loop response in changing the temperature of the web 72 when necessary. If a significant increase in temperature of the web 72 is desired, the corrugator manufacturing apparatus need not be slowed down to effect such a change, rather the instantaneous lowering of half of the rollers will instantly provide an immediate temperature change in the web thus enabling rapid closed-loop process control of web temperature for curing purposes.

Referring now to FIG. 15, a traversing measurement system 139 according to the present invention is shown. System 139 is identical to traversing measurement system 137 in all respects, thus all aspects of system 139 described below also apply to the operational characteristics and componentry of system 134. System 139 appears in FIGS. 1A and 2A while the location of system 137 is shown in FIGS. 1B and 2B. Systems 139 includes a number of movable optical sensors for locating the edge of the web (sensors 224, 226, 228, and 230) and stationary sensors 220 and 222 which, in conjunction with reflectors 234 and 232, enable detection of the distance to each edge of the web 14 (shown by broken lines) located beneath system 139. The components of system 132 include reversible drive motors 200 and 202, chains 201 and 203, pulleys 212, 213, 214, and 215, center position sensors 216 and 218, end of travel sensors 206 and 204, distance sensors 220 and 222, paper edge proximity sensors 224, 226, 228, and 230, and reflectors 232 and 234. The sensors 228 and 230 and reflector 234 are attached to bracket 236. Bracket 236 is mounted to chain 201 so that the bracket moves when motor 200 rotates pulley 213. Bracket 238 moves similarly when motor 202 is activated thereby rotating pulley 215. Sensors 224 and 226 as well as reflector 232 are mounted to bracket 238. It should be apparent that movement of the chains in response to operation of the motors results in the movement of the sensors from the center to the edge of the web and back. Signals from all of the sensors shown in FIG. 15 are supplied to the processor 135 of FIG. 9.

The sensors 224, 226, 228, and 230 supply logic signals indicative of paper presence or absence beneath each sensor. The edge of the web is detected when the outer sensors (226 and 228) produce a signal corresponding to "web not present" and the inner sensors produce a signal corresponding to "web present". Sensors 224, 226, 228, and 230 are reflective proximity sensor well known in the art for detecting the proximity of an object. Such sensors are available from Banner Engineering Corp. of Minneapolis, Minn., model No. SM2A312DQD. Sensors 220 and 222 each include a flexible extension 221 and 223, respectively. The extensions 221 and 223 include optical fibers therewithin which are exposed at the distal end. The exposed optic fibers are positionable via the flexible extensions in any position desired by the user. Here, the extensions are positioned so that the optical fibers are positioned over the physical center of the system 139 and aimed toward the outer edges of the web in the plane of the reflectors. Sensors 220 and 222 each provide an analog distance signal to processor 135 corresponding to the distance from the sensor fiber optics 221 and 223 to the reflectors 232 and 234, respectively. When the edge of the web is detected with sensors 224, 226, 228, and 230, the signals from sensors 220 and 222 provide data to the processor 135 regarding the distance to each edge of the web with regard to the physical center of the system 139. End of travel sensors 204 and 206 include normally closed contacts wired in series with the power signals to motors 202 and 200, respectively, so that if the end of travel is reached, the power to the motors is interrupted.

Figure 16:
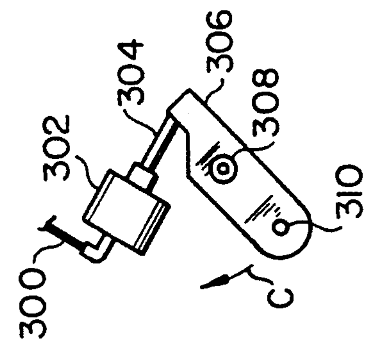
FIG. 16 is a front elevational view of an air cylinder actuator mechanism for vertically moving the rollers in the hot plate section of the corrugator apparatus.

Referring now to FIG. 16, a front elevational view of an air cylinder actuator which is typical for all rollers 74 of an Interfic 1000 Series High Track Conversion hot plate roller section is shown. The mechanism includes actuator arm 306 which moves one end of a roller 74 when the air cylinder 302 receives compressed air through air line 300. Each roller 74 is mounted in its own unique pivot arm identical to arm 306. The rod 304 moves when compressed air is supplied to cylinder 302 resulting in arm 306 pivoting about pin 308 and moving roller mount location 310 upwards in the direction of the arrow labeled C. A one-to-one correspondence between the valves 127 of FIG. 9 and the rollers 74 exists in the Interfic device. Each valve controls the vertical position of an individual roller so that by actuating more or less valves, varying amounts of heat are transferred to the web beneath the rollers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for conditioning a web during the manufacture of corrugated cardboard, the method comprising the steps of:

sensing moisture content in said web for each of a plurality of zones of said web, said zones arranged transversely with respect to the direction of movement of said web; and supplying saturated steam to said web in certain ones of said plurality of zones in response to the sensed moisture content of each of said plurality of zones to lower the moisture content of said web in certain ones of said plurality of zones and achieve a substantially consistent moisture content for the web in each of said zones thereby minimizing warping of the cardboard.

2. The method of claim 1 further comprising:

sensing temperature of said web; and heating said web in accordance with the sensed temperature to maintain the temperature of said web within a predetermined range.

3. An improved method for curing a web during the manufacture of corrugated cardboard wherein said web is divided into a plurality of zones situated adjacent one another and transversely with respect to the direction of movement of said web, the method comprising the steps of:

sensing the moisture content in said web for each of said plurality of zones of said web;

supplying saturated steam to said web in certain ones of said plurality of zones in response to the sensed moisture content of said plurality of zones to lower the moisture content of said web in certain ones of said plurality of zones and achieve a substantially consistent moisture content for the web in each of said zones thereby minimizing warping of the cardboard;

sensing temperature of said web; and heating said web in response to said sensed temperature signal to maintain the exit temperature of said web within a predetermined curing range.

4. The method of claim 3 wherein hot plates provide heat to said web and movable rollers increase contact and heat transfer between said web and said hot plates.

5. The method of claim 4 further comprising:

varying the heat supplied to said hot plates in accordance with the sensed temperature of said web to maintain the temperature of said web within said predetermined curing range; and positioning said rollers relative to said hot plates to vary the portion of said web contacting said hot plates in accordance with the sensed temperature and maintain the temperature of said web within said predetermined curing range.

6. The method of claim 5 further comprising positioning said rollers so that a predetermined number of rollers are available to increase the portion of said web contacting said hot plates.

7. The method of claim 6 wherein said predetermined number is half of said rollers.

* * * * *

CERTIFICATE OF CORRECTION

PATENT NO. : 5,244,518 Page 1 of 2

DATED : September 14, 1993

INVENTOR(S) : Everett D. Krayenhagen, et al.

It is certified that error appears in the above-indentified patent and that said Letters Patent is hereby corrected as shown below:

In column 5, at line 34, please replace "33" with --34--.

In column 5, at line 34, please replace "34" with --33--.

Column 8, line 65, replace "that" with
--than--.

In column 10, at line 46, please replace "124" with --143--.

In column 11, at line 48, please replace "transversing" with --traversing--.

In column 12, at line 11, please replace "transversing" with --traversing--.

UNITED STATES PATENT AND TRADEMARK OFFICE

CERTIFICATE OF CORRECTION

PATENT NO. : 5,244,518

DATED : September 14, 1993

INVENTOR(S) : Everett D. Krayenhagen, et. al.

It is certified that error appears in the above-indentified patent and that said Letters Patent is hereby corrected as shown below:

Column 15, line 60, replace "132" with —139—.

Signed and Sealed this

Tenth Day of January, 1995

Attest:

Bruce Lehman

BRUCE LEHMAN

*Attesting Officer*

*Commissioner of Patents and Trademarks*